US009411090B2

(12) United States Patent
Hashizume et al.

(10) Patent No.: US 9,411,090 B2
(45) Date of Patent: Aug. 9, 2016

(54) BACKLIGHT SYSTEM

(71) Applicants: Kenichi Hashizume, Kitagunma-gun (JP); Shunichiro Kuroki, Tokyo (JP)

(72) Inventors: Kenichi Hashizume, Kitagunma-gun (JP); Shunichiro Kuroki, Tokyo (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 13/977,318

(22) PCT Filed: Nov. 21, 2012

(86) PCT No.: PCT/JP2012/007499
§ 371 (c)(1),
(2) Date: Jun. 28, 2013

(87) PCT Pub. No.: WO2014/080441
PCT Pub. Date: May 30, 2014

(65) Prior Publication Data
US 2015/0268403 A1   Sep. 24, 2015

(51) Int. Cl.
*F21V 8/00* (2006.01)
*G02F 1/1335* (2006.01)

(52) U.S. Cl.
CPC ............ *G02B 6/0035* (2013.01); *G02B 6/0003* (2013.01); *G02B 6/0065* (2013.01); *G02B 6/0073* (2013.01); *G02B 6/0055* (2013.01); *G02F 1/133615* (2013.01); *G02F 2001/133614* (2013.01)

(58) Field of Classification Search
CPC ............................. G02B 6/0065; G02B 6/0055
See application file for complete search history.

(56) References Cited

U.S. PATENT DOCUMENTS

| | | | |
|---|---|---|---|
| 2003/0002272 A1* | 1/2003 | Suehiro et al. | 362/84 |
| 2003/0012008 A1* | 1/2003 | Chang et al. | 362/27 |
| 2004/0130912 A1* | 7/2004 | Miyashita | 362/561 |
| 2005/0057145 A1* | 3/2005 | Shieh et al. | 313/503 |
| 2007/0096113 A1* | 5/2007 | Inoshita et al. | 257/79 |
| 2010/0195349 A1 | 8/2010 | Kanade et al. | |
| 2010/0202157 A1 | 8/2010 | Jang et al. | |
| 2011/0090713 A1* | 4/2011 | Chen et al. | 362/612 |

(Continued)

FOREIGN PATENT DOCUMENTS

| | | |
|---|---|---|
| EP | 2216591 A2 | 8/2010 |
| JP | 2008-20748 | 1/2008 |

(Continued)

OTHER PUBLICATIONS

Xu, Edward. "Ultra Thin Flexible LCD Display—Plastic Film Base Material" http://thecoolgadgets.com/ultra-thin-flexible-lcd-display-plastic-film-base-material/; 2009-2013, 10 pages.

(Continued)

*Primary Examiner* — Elmito Breval
(74) *Attorney, Agent, or Firm* — Turk IP Law, LLC (57) ABSTRACT

Backlight systems including a core layer, configured to be flexible, and at least one light source are described. The core layer contains at least one light-excited fluorophore. The light source is arranged on an edge of one side of the core layer. Further, the light source is configured to emit first light into the core layer through the edge of the one side of the core layer. The core layer is configured to transmit the first light therein and to emit second light caused by the light-excited fluorophores irradiated by the first light from a first surface of the core layer.

22 Claims, 3 Drawing Sheets

(56) References Cited

U.S. PATENT DOCUMENTS

| | | | | |
|---|---|---|---|---|
| 2011/0176328 | A1* | 7/2011 | Anandan et al. | 362/606 |
| 2011/0255303 | A1 | 10/2011 | Nichol et al. | |
| 2011/0317283 | A1* | 12/2011 | Shim | G02B 1/041 359/722 |
| 2012/0176766 | A1* | 7/2012 | Natsumeda | 362/19 |
| 2012/0313045 | A1* | 12/2012 | Shim | 252/301.36 |
| 2014/0063568 | A1* | 3/2014 | Wilsher et al. | 358/475 |
| 2014/0119052 | A1* | 5/2014 | Hayama | 362/611 |
| 2014/0286048 | A1* | 9/2014 | Riello et al. | 362/608 |

FOREIGN PATENT DOCUMENTS

| | | |
|---|---|---|
| JP | 2009-16289 | 1/2009 |
| JP | 2010-182664 | 8/2010 |
| JP | 2011-503771 | 1/2011 |
| TW | M354761 U | 4/2009 |
| TW | 201104316 A | 2/2011 |
| WO | WO 2009/004598 | 1/2009 |

OTHER PUBLICATIONS

Metallic Reflector Coating www.molalla.com/~leeper/refcoat.pdf; [retrieved from internet Apr. 24, 2013]; 2 pages.

Olefin (base) Thermoplastic Elastomer "ZELAS", http://www.mcc-spd.com/en/product/zelas/zelas.html; 2006, Mitsubishi Chemical Corp.; 2 pages.

Styrene (base) Thermoplastic Elastomer "Rabalon", http://www.mcc-spd.com/en/product/rabalon/rabalon.html; [retrieved from internet Apr. 24, 2013]; 1 page.

Acrylic Thermoplastic Elastomer "Kurarity", http://www.kuraray.co.jp/en/products/chemical/kurarity.html; [retrieved from internet Apr. 24, 2013]; 1 page.

Polyurethane based elastomer "Visela", http://www.inoac.co.jp/kasei/products/material/visela/index.html; [retrieved from internet Apr. 24, 2013]; 2003-2007; 2 pages.

Silicone rubber "Opticrysta", http://www.fujipoly.co.jp/products/other_06/lgf/index.htm; [retrieved from internet Apr. 24, 2013] 2009, 4 pages.

Development of novel transparent fluorescent compounds and their application to emission devices, www.toshiba.co.jp/tech/review/2007/05/62_05pdf/f01.pdf; vol. 62, No. 5, 2007, 4 pages.

International Search Report and Written Opinion; International Application No. PCT/JP2012/007499; Filed Nov. 12, 2012; 6 pages.

Hasegawa, Y. et al., "Enhancement of luminescence of Nd3+ complexes with deuterated hexafluoroacetylacetonato ligands in organic solvent," Chemical Physics Letters, vol. 248, No. 1-2, pp. 8-12 (Jan. 5, 1996).

Hasegawa, Y. et al., "Luminescence of Novel Neodymium Sulfonylaminate Complexes in Organic Media," Angewandte Chemie, vol. 39, No. 2, pp. 357-360 (Jan. 17, 2000).

Ryo, M. et al., "Intrazeolite Nanostructure of Nd(III) Complex Giving Strong Near-Infrared Luminescence,", J. Phys. Chem. B, vol. 107, No. 41, pp. 11302-11306 (2003).

Wada, et al., "High Efficiency Near-IR Emission of Nd(III) Based on Low-Vibrational Environment in Cages of Nanosized Zeolites," J. Am. Chem. Soc., vol. 122, No. 35, pp. 8583-8584 (2000).

Yanagida, S. et al., "Remarkable luminescence of novel Nd(III) complexes with low-vibrational hexafluoroacetylacetone and DMSO-d6 molecules," Journal of Luminescence, vol. 87-89, pp. 995-998 (May 2000).

* cited by examiner

BACKLIGHT SYSTEM

CROSS-REFERENCE TO RELATED APPLICATION

This application is the U.S. National Phase under 35 U.S.C. §371 of International Application No. PCT/JP2012/007499, filed Nov. 21, 2012, the contents of which are herein incorporated by reference in its entirety.

BACKGROUND

Liquid crystal displays (LCDs) are display devices that use light modulating properties of crystal liquids. As the crystal liquids do not emit light directly, the LCDs require a surface light source to evenly illuminate an entire surface of a panel or screen. Backlighting is a well-known example of a surface light source technology, and thus a backlight system is typically used for such an LCD.

An example of a backlight system is an edge-light type backlight system, in which light sources are arranged on a side surface of a light guide plate. The light guide plate is made of, for example, a material such as an acrylic resin.

SUMMARY

In accordance with one aspect, a backlight system having a flexible structure is provided. In some embodiments, the backlight system may include a core layer, configured to be flexible, and at least one light source. The core layer may contain light-excited fluorophores therein. The light source may be arranged on an edge of one side of the core layer. Further, the light source may be configured to emit first light into the core layer through the edge of the one side of the core layer. The core layer may be configured to transmit the first light therein and to emit second light caused by the light-excited fluorophores irradiated by the first light from a first surface of the core layer.

In accordance with another aspect, a display system having a flexible structure is provided. In some embodiments, the display system may include the above-described backlight system and a liquid crystal module.

In accordance with yet another aspect, a method is provided for controlling an illumination of the backlight system. In some embodiments, the method of controlling the illumination of the backlight system may include introducing first light into a core layer and emitting second light. The first light may be introduced into the core layer by at least one light source through an edge of one side of the core layer. The core layer may be configured to be flexible. The core layer may contain light-excited fluorophores therein. The second light may be emitted by being caused by the light-excited fluorophores.

In accordance with yet another aspect, a method of manufacturing the backlight system is provided. In some embodiments, the method of manufacturing the backlight system may include providing a core layer, configured to be flexible, and arranging at least one light source on an edge of one side of the core layer.

DETAILED DESCRIPTION

In the following detailed description, reference is made to the accompanying drawings, which form a part hereof. In the drawings, similar symbols typically identify similar components, unless context dictates otherwise. Further, the drawings are intended to be explanatory and may not be drawn to scale. The illustrative embodiments described in the detailed description, drawings, and claims are not meant to be limiting. Other embodiments may be utilized, and other changes may be made, without departing from the spirit or scope of the subject matter presented herein, it will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure generally describes techniques, structures, devices, apparatuses, systems and methods for back-lighting, including, but not limited to, introducing first light into a flexible core layer by at least one light source, and thereby emitting second light caused by light-excited fluorophores irradiated by the first light. In some embodiments, the light-excited fluorophores may be contained in the core layer.

(Backlight System)

Figure 1:
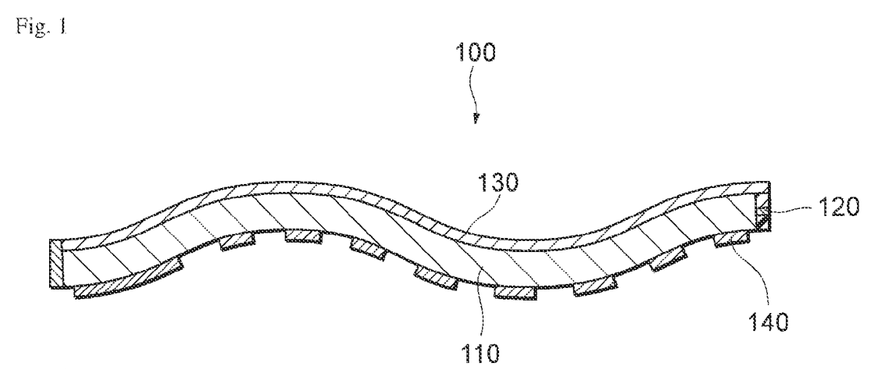
FIG. 1 is a schematic cross-sectional view showing an example of a backlight system arranged in accordance with the present disclosure.

FIG. 1 is a schematic cross-sectional view showing an example of a backlight system arranged in accordance with some embodiments. As shown in FIG. 1, the backlight system 100 of the present disclosure includes a core layer 110 configured to be flexible and at least one light source 120. The backlight system 100 may include a shell layer 130 to reduce or eliminate leakage of light from the light source 120. The backlight system 100 may further include a reflective layer 140 to control a reflecting light intensity to provide a more uniform illuminating property.

(Core Layer)

The core layer 110 may be configured to transmit a first light therein and to emit a second light caused by light-excited fluorophores irradiated by the first light from a first surface of the core layer 110. The core layer 110 may be made of, for example, a transparent polymer material, as discussed later. A non-limiting example of a thickness of the core layer 110 may be, for example, in a range of from 0.1 millimeters to 10 millimeters. As the thickness of the core layer 110 decreases from the upper limit, the productivity of the back light system is improved. The thickness of the core layer 110 may depend on the size of a device using the back light system.

The core layer 110 may contain one or more light-excited fluorophores therein. As a non-limiting example, the light-excited fluorophores may be adapted to emit visible light upon irradiation by ultraviolet light. For example, the light-excited fluorophores may be comprised of, but are not limited to being comprised of, a metal complex. As a further non-limiting example, the metal complex comprising the light-excited fluorophores may be at least one metal complex selected from the group consisting of europium complex, niobium complex, praseodymium complex, neodymium complex, samarium complex, gadolinium complex, terbium complex, dysprosium complex, holmium complex, erbium complex, thulium complex and ytterbium complex. Further, a specific example of the metal complex may be at least one metal complex selected from the group consisting of compounds represented by the following formulae (1) to (10).

[Chem. 1]

(1)

In formula (1), $R^1$, $R^2$, $R^3$ and $R^4$ each independently represent an organic group, and $R^1$ and $R^2$ differ from each other. Specific examples of $R^1$, $R^2$, $R^3$ and $R^4$ may be, for example, an alkyl group. Examples of the alkyl group may be, for example, a methyl group, an ethyl group, a propyl group, a butyl group, a stearyl group or a cetyl group. As the alkyl carbon number increases, the dispersibility of the compound represented by formula (1) in the core layer 110 is improved.

[Chem. 2]

(2)

In formula (2), $R^1$, $R^2$, $R^3$ and $R^4$ each independently represent an organic group, and $R^1$ and $R^2$ differ from each other. Specific examples of $R^1$, $R^2$, $R^3$ and $R^4$ may be, for example, an alkyl group. Examples of the alkyl group may be, for example, a methyl group, an ethyl group, a propyl group, a butyl group, a stearyl group or a cetyl group. As the alkyl carbon number increases, the dispersibility of the compound represented by formula (2) in the core layer 110 is improved.

[Chem. 3]

(3)

In formula (3), n is an integer of from 1 to 18 inclusive, and may, as a non-limiting example, be an integer of from 3 to 12 inclusive. As n increases from the lower limit, the dispersibility of the compound represented by formula (3) in the core layer 110 is improved, whereas as n decreases from the upper limit, the heat stability of the compound represented by formula (3) is improved.

[Chem. 4]

(4)

In formula (4), m and n are each independently integers of from 1 to 18 inclusive, and may, as a non-limiting example, be integers of from 3 to 12 inclusive. As m and n increase from the lower limit, the dispersibility of the compound represented by formula (4) in the core layer 110 is improved, whereas as m and n decrease from the upper limit, the heat stability of the compound represented by formula (4) is improved.

[Chem. 5]

(5)

In formula (5), n is an integer of from 1 to 18 inclusive, and may, as a non-limiting example, be an integer of from 3 to 12 inclusive. As n increases from the lower limit, the dispersibility of the compound represented by formula (5) in the core layer 110 is improved, whereas as n decreases from the upper limit, the heat stability of the compound represented by formula (5) is improved.

[Chem. 6]

(6)

In formula (6), n is an integer of from 1 to 18 inclusive, and may, as a non-limiting example, be an integer of from 3 to 12 inclusive. As n increases from the lower limit, the dispersibility of the compound represented by formula (6) in the core layer 110 is improved, whereas as n decreases from the upper limit, the heat stability of the compound represented by formula (6) is improved. In formula (6), D represents deuterium.

[Chem. 7]

(7)

In formula (7), D represents deuterium.

[Chem. 8]

(8)

In formula (8), D represents deuterium.

[Chem. 9]

(9)

In formula (9), n is an integer of from 1 to 18 inclusive, and may, as a non-limiting example, be an integer of from 3 to 12 inclusive. As n increases from the lower limit, the dispersibility of the compound represented by formula (9) in the core layer 110 is improved, whereas as n decreases from the upper limit, the heat stability of the compound represented by formula (9) is improved.

[Chem. 10]

(10)

In formula (10), D represents deuterium.

The concentration of the light-excited fluorophores contained in the core layer 110 may be defined by various methods in addition to a molar concentration. For example, the concentration may be defined by the desired color and intensity of the illumination, the size of the backlight system and on forth. Further, the light-excited fluorophores can be dispersed in a gradient concentration to improve the uniformity of the illumination. The concentration of the light-excited fluorophores can be increased with increasing distance from the edge of the at least one side of the core layer 110 where the light source 120 is placed. By proceeding in this manner, the core layer 110 may have more uniform light emission properties. A non-limiting example of the concentration of the light-excited fluorophores contained in the core layer 110 may be, for example, in a range of from 0.01 percent by weight to 5 percent by weight. The core layer 110 may emit white light by controlling the color of the light-excited fluorophores. The intensity of the illumination may depend on the type of the light-excited fluorophores.

As mentioned above, the core layer 110 may be made of, for example, at least one transparent polymer material. As a non-limiting example, the transparent polymer material may be, but is not limited to being, a thermoplastic elastomer. An example of the thermoplastic elastomer may be at least one thermoplastic elastomer selected from the group consisting of olefin-type elastomer, rubber containing polypropylene, styrene-based elastomer, acryl-based elastomer, polyurethane-based elastomer, silicone rubber, silicone elastomer, polycarbonate film and transparent polyimide. In the backlight system 100 of the present disclosure, the core layer 110 may be formed using the above-described thermoplastic elastomer, whereby the backlight system 100 can be applied to a flexible display, for example.

The production method of the core layer 110 may be an extrusion molding method comprising a step of mixing the light-excited fluorophores and the transparent polymer to obtain a mixture and a step of forming the mixture by a melt extruder to obtain a core layer.

(Light Source)

As shown in FIG. 1, the light source 120 may be arranged on an edge of at least one side of the core layer 110. Further, the plurality of light sources 120 may be arranged on an edge of at least one side of the core layer 110. In addition, at least one of the light sources 120 may be arranged on an edge of a first side of the core layer 110, and at least another one of the light sources 120 may be arranged on an edge of a second side orthogonal to the first side of the core layer 110. As a non-limiting example, the light source 120 may be configured to emit first light into the core layer 110 through the edge of the at least one side of the core layer 110. As a further non-limiting example, the light source 120 may be a light-emitting diode configured to emit invisible light such as, but not limited to, ultraviolet light. Additionally, the light source 120 may be a red light-emitting diode, a green light-emitting diode, or a blue light-emitting diode. As a further non-limiting example, the light source 120 may be a cold cathode fluorescent lamp.

(Shell Layer)

As shown in, for example, FIG. 1, the backlight system 100 may further include at least one shell layer 130. The shell layer 130 may be arranged on the first surface of the core layer 110. The shell layer 130 may have a lower reflectance than the core layer 110. A non-limiting example of a reflectance of the shell layer 130 may be from 1.2 to 3. By this configuration, the shell layer 130 may allow the leakage of light from the first surface of the core layer 110 to be reduced or prevented. Thus, the light introduced from the light source 120 may be used for the excitation of the light-excited fluorophores with a high level of efficiency, as well as with a high level of safety without the light leakage when UV LED is used as the light source 120. An example of a thickness of the shell layer 130 may be, but is not limited to being, in a range of from 1 micrometer to several millimeters. The shell layer 130 may, for example, comprise at least one material selected from the group consisting of a metal, a metal oxide and a polymer. The shell layer 130 may be comprised of at least one material having a refractive index of 1.7 or higher. Specific examples of the material having a refractive index of 1.7 or higher are Zn, ZnO, ZnS, Zinc White, $PbTiO_2$, ZnTe, $Pb_3O_4$, $PbCrO_4$, $ZnCrO_4$, $Cr_2O_3$, ZrO, $TiO_2$, $Al_2O_3$, CdO, CdS, AgCl, C (diamond), W, Fe, $Fe_2O_3$, $Fe_3O_4$, $Cu_2O$, CuCl, $CuSO_4$, Sb, $TiO_2$, $BaTiO_3$, $BaCrO_4$, BaS, MgO, Mn, $(NH_4)_2Mn_2(P_2O_2)_2$, $SrTiO_3$, $SrCrO_2$, SrS, Ni, HgS, $Y_2O_3$, $Eu_7O_3$, $La_2O_3$, Pt, Ge, CsI, TlCl, TlBr, $As_2Se_3$, beta-SiC, $ZnS+BaSO_4$, polyethylene terephthalate, triacetylcellulose, Poly(pentabromophenyl methacrylate) and Poly(pentabromobenzyl methacrylate). A specific example of the shell layer 130 is a layer comprising a zinc-containing compound such as Zn, ZnO or ZnS.

The production method of the shell layer 130 may be a sputtering method comprising a step of sputtering the above raw material of the shell layer 130 on the core layer 110. Specific examples of the sputtering method may be, for example, a method comprising a step of sputtering $TiO_2$ and $SiO_2$ on the core layer 110 to form the $TiO_2$ and $SiO_2$ layer in a range of from 5 micrometers to 100 micrometers and a step of repeating the above step at least ten times. In addition, the production method of the shell layer 130 may be a coating or laminating method comprising a step of coating or laminating the above raw material of the shell layer 130 on the core layer 110. Specific examples of the coating or laminating method may be, for example, a method comprising a step of dissolving the above raw material of the shell layer 130 in a solvent to obtain a solution and a step of coating or laminating the solution directly on the core layer 110. A non-limiting example of the solvent may be, for example, alcohol, halogenated hydrocarbons, acetone or acetonitrile.

(Reflective Layer)

As shown in, for example, FIG. 1, the backlight system 100 may further include the reflective layer 140. The reflective layer 140 may be arranged on at least a portion of a second surface opposing the first surface of the core layer 110. The reflective layer 140 may be arranged in a pattern on the second surface to control the reflecting light intensity. For example, the coverage area of the reflective layer 140 may be increased with increasing distance from the edge of the at least one side of the core layer 110 where the light source 120 is placed. By proceeding in this manner, the core layer 110 may have more uniform light emission properties. An example of a thickness of the reflective layer 140 may be, but is not limited to being, in a range of from 1 micrometer to several millimeters. The reflective layer 140 may, for example, comprise at least one material selected from the group consisting of a metal, a metal oxide and a polymer. The reflective layer 140 may be comprised of at least one material having a refractive index of 1.7 or higher. Specific examples of the material having a refractive index of 1.7 or higher are Zn, ZnO, ZnS, Zinc White, $PbTiO_2$, ZnTe, $PbCrO_4$, $ZnCrO_4$, ZrO, $TiO_2$, $Al_2O_3$, CdS, AgCl, C (diamond), W, Fe, $Fe_2O_3$, $Cu_2O$, CuCl, $CuSO_4$, Sb, $TiO_2$, $BaTiO_3$, $BaCrO_4$, BaS, MgO, Mn, $(NH_4)_2Mn_2(P_2O_7)_2$, $SrTiO_3$, $SrCrO_4$, SrS, Ni, HgS, $Y_2O_3$, $Eu_2O_3$, $La_2O_3$, Pt, Ge, TlCl, $As_2Se_3$, beta-SiC, $ZnS+BaSO_4$, polyethylene terephthalate, triacetylcellulose, Poly(pentabromophenyl methacrylate) and Poly(pentabromobenzyl methacrylate). A specific example of the reflective layer 140 is a layer comprising a zinc-containing compound such as Zn, ZnO or ZnS. Other specific examples of the reflective layer 140 are a layer comprising metals such as aluminum, silver, SUS (Stainless Used Steel) or gold.

The production method of the reflective layer 140 may be a printing method comprising a step of printing the above raw material of the reflective layer 140 on the core layer 110. Specific examples of the printing method may be, for example, a screen printing method, an offset printing method, or a gravure printing method.

The above-described backlight system 100 arranged in accordance with the present disclosure may, for example, be used for a display system, in particular, for a flexible display system.

(Display System)

A display system may be configured to include the above-described backlight system. A specific, non-limiting example of the display system may be an LCD. The display system may be used for a wide variety of applications including, but not limited to, displays for cell phones, digital cameras, televisions, personal computers, and so on.

(Method of Controlling Illumination of a Backlight System)

Figure 2:
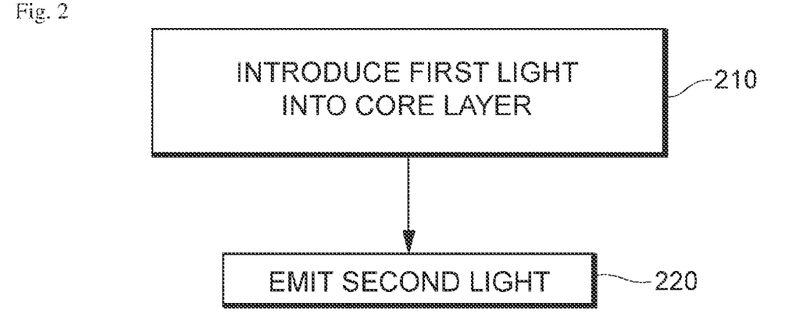
FIG. 2 is a flowchart showing an example of a method of controlling illumination of a backlight system arranged in accordance with the present disclosure.

As shown in FIG. 2, in operation 210, the first light is introduced into a core layer 110 by at least one light source 120 through an edge of one side of the core layer 110. The core layer 110 may be configured to be flexible. The core layer 110 may contain light-excited fluorophores therein. In operation 220, second light may be emitted by being caused by the light-excited fluorophores excited by the first light. A shell layer 130 may be arranged on a first surface of the core layer 110. Reflecting of the first light by the shell layer 130 may further be performed. The reflecting may, for example, prevent leakage of light from the first surface of the core layer 110. As a result, the first light introduced from the light source 120 may be utilized for the excitation of the light-excited fluorophores with a high level of efficiency. The shell layer 130 may have a lower reflectance than the core layer 110. As a non-limiting example, the first light may be ultraviolet light. As a further non-limiting example, the light-excited fluorophores may be ultraviolet-excited fluorophores adapted to emit visible light by irradiation of ultraviolet light. With this configuration and steps, the backlight system 100 illuminates uniformly even though it is a flexible backlight.

Figure 3:
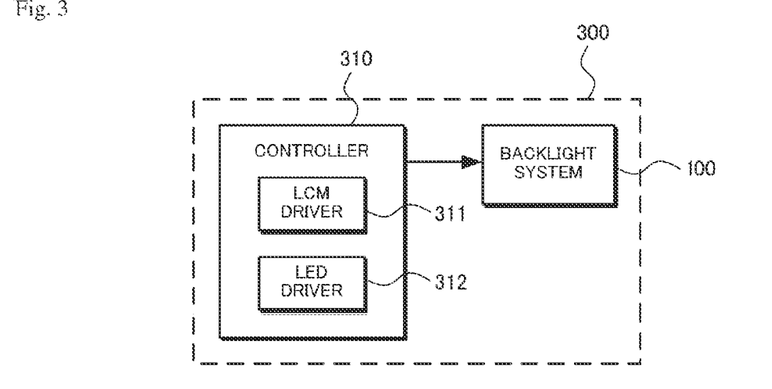
FIG. 3 is a block diagram showing an example of a display device using a backlight system in accordance with the present invention.

FIG. 3 is a block diagram showing an example of a display device using a backlight system in accordance with the present invention. Referring to FIG. 3, a display device 300 may include a backlight system 100 and a controller 310 configured to control operation of the backlight system 100. The controller 310 may include a liquid crystal module driver (LCM driver) 311, and a light-emitting device driver (LED driver) 312. The controller 310 may be implemented as hardware or as software, or alternatively, firmware, that is executed on a processor. As one non-limiting example, the controller 310 may be implemented by a computing device 400 discussed with reference to FIG. 4.

The LCM driver 311 may be configured to drive the TFTs of the liquid crystal module in accordance with video signals generated, in order to form images. The LED driver 312 may be configured to drive the light-emitting devices (light source 120) in order to emit light into the core layer 110. The controller 310 may control operations of the LED driver 312 so that the light-emitting devices may emit light into the core layer 110.

Figure 4:
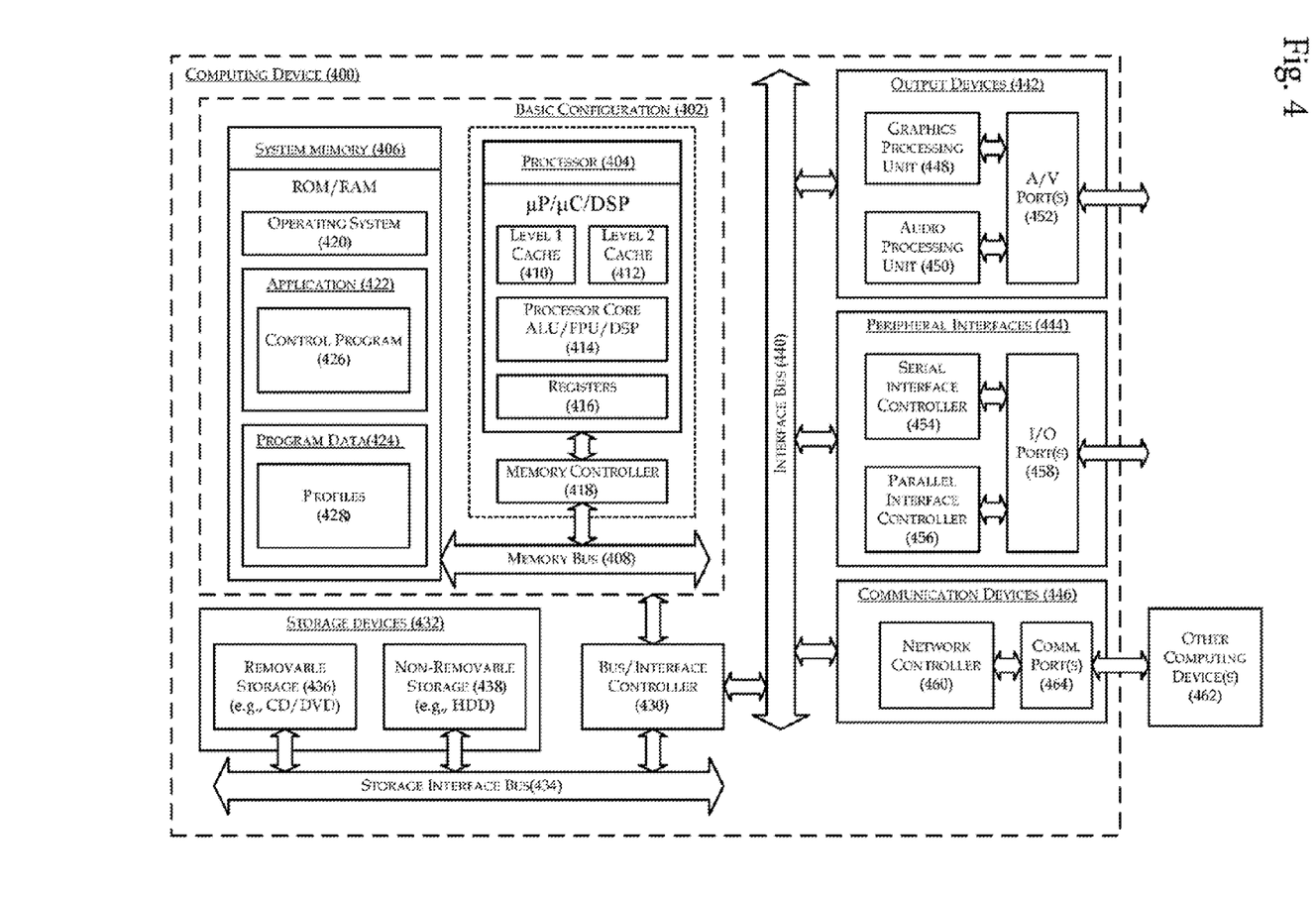
FIG. 4 is a block diagram showing an example of a computing device that is arranged for a backlight system in accordance with the present disclosure.

FIG. 4 is a block diagram illustrating a non-limiting example of a computing device 400 that is arranged for a backlight system in accordance with the present disclosure. In a very basic configuration 402, the computing device 400 typically includes one or more processors 404 and a system memory 406. A memory bus 408 may be used for communicating between the processor 404 and the system memory 406.

Depending on the desired configuration, the processor 404 may be of any type, including, but not limited to, a microprocessor, a microcontroller, a digital signal processor (DSP), or any combination thereof. The processor 404 may include one or more levels of caching, such as a level one cache 410 and a level two cache 412, a processor core 414, and registers 416. The example processor core 414 may include an arithmetic logic unit (ALU), a floating point unit (FPU), a digital signal processing core (DSP Core), or any combination thereof. An example memory controller 418 may also be used with the processor 404, or in some implementations the memory controller 418 may be an internal part of the processor 404.

Depending on the desired configuration, the system memory 406 may be of any type, including, but not limited to, volatile memory (such as RAM), non-volatile memory (such as ROM, flash memory, etc.) or any combination thereof. The system memory 406 may include an operating system 420, one or more applications 422, and program data 424. The application 422 may include a control program 426 that is arranged to control the light source 120 to emit visible light into the core layer 110. The program data 424 may include profiles 428 that may be useful for controlling a backlight system, as is described herein. In some embodiments, the application 422 may be arranged to operate with the program data 424 on the operating system 420 such that the implementation of light guide control may be provided as described herein. This described basic configuration 402 is illustrated in FIG. 4 by those components within the inner dashed line.

The computing device 400 may have additional features or functionality, and additional interfaces to facilitate communications between the basic configuration 402 and any required devices and interfaces. For example, a bus/interface controller 430 may be used to facilitate communications between the basic configuration 402 and one or more data storage devices 432 via a storage interface bus 434. The data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Examples of computer storage media may include volatile and nonvolatile, removable and non-removable media implemented in any method or technology for storage of information, such as computer readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (e.g., output devices 442, peripheral interfaces 444, and communication devices 446) to the basic configuration 402 via the bus/interface controller 430. The example output devices 442 include a graphics processing unit 448 and an audio processing unit 450, which may be configured to communicate with various external devices such as a display or speakers via one or more A/V ports 452. The example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. The example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a portion of a small-form factor portable (or mobile) electronic device, such as a cell phone, a personal data assistant (FDA), a personal media player device, a wireless web-watch device, a personal headset device, an application specific device, or a hybrid device that includes any of the above functions. The computing device 400 may also be implemented as a personal computer including both laptop computer and non-laptop computer configurations.

(Method of Manufacturing a Backlight System)

Figure 5:
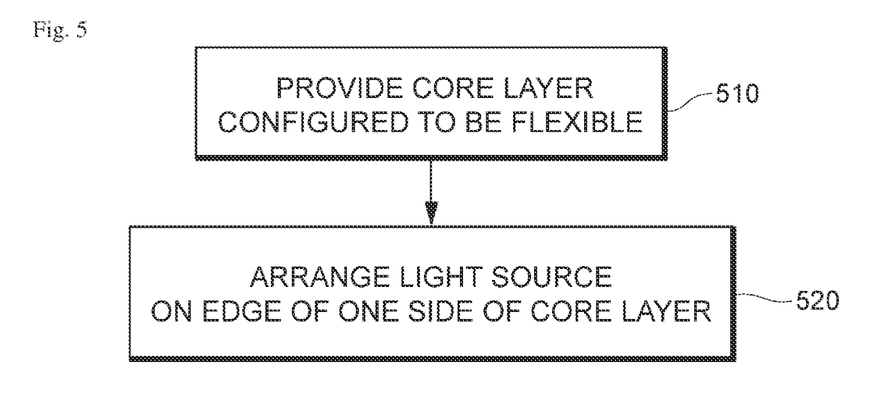
FIG. 5 is a flowchart showing an example of a method of manufacturing a backlight system arranged in accordance with the present disclosure.

As shown in FIG. 5, in operation 510, a core layer 110, configured to be flexible, may be provided. The core layer 110 may contain light-excited fluorophores therein. In operation 520, at least one light source 120 may be arranged on an edge of one side of the core layer 110. The light source 120 may emit first light into the core layer 110 through the edge of the one side of the core layer 110. Further, arranging a shell layer 130 on a first surface of the core layer 110 may be performed. Moreover, arranging a reflective layer 140 on at least a portion of a second surface of the core layer 110 opposing the first surface may further be performed. Additionally, arranging the reflective layer 140 in a pattern on the second surface to control the reflecting light intensity may further be performed. For example, the coverage area of the reflective layer 140 can be increased with increasing distance from the edge of the at least one side of the core layer 110 where the light source 120 is placed. By proceeding in this manner, the core layer 110 may have more uniform light emission properties.

The backlight system obtained by the above-described manufacturing method may be used for a display system, in particular, a flexible LCD.

Further, in operation 510, the concentration of the light-excited fluorophores contained in the core layer 110 may be defined, for example, to increase as the distance from the edge of the at least one side of the core layer 110 increases. By proceeding in this manner, a backlight system having more uniform light emission properties may be obtained.

Example 1

An example of a backlight system 100 may include a core layer 110 configured to be flexible, at least one light source 120, a shell layer 130, a reflective layer 140, as shown in FIG. 1. A non-limiting example of a thickness of the core layer 110 may be 0.5 millimeters. A non-limiting example of a thickness of the shell layer 130 may be 5 micrometers. A non-limiting example of a thickness of the reflective layer 140 may be 50 micrometers. A non-limiting example of a shape of the core layer 110 may be a rectangle. A non-limiting example of a shape of the shell layer 130 may be a rectangle. The core layer 110 may be formed of, for example, olefin-type elastomer. The core layer 110 may contain, for example, a europium complex therein as light-excited fluorophores. The concentration of the light-excited fluorophores contained in the core layer 110 may be defined, for example, to increase as the distance from an edge of a right side of the core layer 110 increases. The shell layer 130 may be a layer comprising a zinc-containing compound. The reflective layer 140 may be formed of a zinc-containing compound.

As a non-limiting example, the light source 120 may be arranged on a right end surface of the core layer 110. The light sources 120 may, for example, be arranged in a straight line on the right end surface of the core layer 110 at regular intervals. As a further non-limiting example, the light source 120 may be a light-emitting diode configured to emit ultraviolet light.

A display system including a backlight system as discussed in Example 1 can bring about a further improvement in the quality. A non-limiting example of the display system may be configured by interposing a liquid crystal panel, a middle frame and the above-described backlight system between a front chassis and a back chassis. Such a display system may be used, for example, for a large liquid crystal monitor, an on-vehicle liquid crystal display (liquid crystal car navigation), a cell phone display, a game-machine liquid crystal display, a medical liquid crystal monitor and a printing-design liquid crystal monitor. Specific examples of devices using the display system may be, for example, e-Books, Tablet devices and e-posters.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

While the present disclosure has been described with respect to a limited number of embodiments, those skilled in the art, having the benefit of this disclosure, will appreciate that other embodiments can be devised which do not depart from the scope of the present disclosure as disclosed herein. Accordingly, the scope of the present disclosure should be limited only by the attached claims.

The invention claimed is:

1. A backlight system comprising:
a core layer configured to be flexible and containing light-excited fluorophores therein;
at least one light source arranged on an edge of one side of the core layer and configured to emit first light into the core layer through the edge thereof,
wherein the light-excited fluorophores are dispersed in the core layer; and
wherein the core layer is configured to transmit the first light therein and to emit second light caused by the light-excited fluorophores irradiated by the first light from a first surface of the core layer; and
a shell layer arranged on the first surface of the core layer, wherein the shell layer has a lower reflectance than the core layer.

2. The backlight system of claim 1, further comprising a reflective layer arranged on at least a portion of a second surface of the core layer opposing the first surface.

3. The backlight system of claim 2, wherein the reflective layer is comprised of at least one material selected from the group consisting of a metal, a metal oxide and a polymer.

4. The backlight system of claim 2, wherein the reflective layer is comprised of at least one material having a refractive index of 1.7 or higher.

5. The backlight system of claim 1, wherein the at least one light source is a light emitting diode configured to emit ultraviolet light.

6. The backlight system of claim 5, wherein the light-excited fluorophores are ultraviolet-excited fluorophores adapted to emit visible light by irradiation of the ultraviolet light.

7. The backlight system of claim 1, wherein the core layer is formed of a transparent polymer.

8. The backlight system of claim 7, wherein the transparent polymer is a thermoplastic elastomer.

9. The backlight system of claim 8, wherein the thermoplastic elastomer is at least one thermoplastic elastomer selected from the group consisting of olefin-type elastomer, rubber containing polypropylene, styrene-based elastomer, acryl-based elastomer, polyurethane-based elastomer, silicone rubber, silicone elastomer, polycarbonate film and transparent polyimide.

10. The backlight system of claim 1, wherein the light-excited fluorophores are comprised of a metal complex.

11. The backlight system of claim 1, wherein the light-excited fluorophores are comprised of at least one metal complex selected from the group consisting of europium complex, niobium complex, praseodymium complex, neodymium complex, samarium complex, gadolinium complex, terbium complex, dysprosium complex, holmium complex, erbium complex, thulium complex and ytterbium complex.

12. The backlight system of claim 1, wherein the light-excited fluorophores are comprised of at least one metal complex selected from the group consisting of compounds represented by the following, formulae (1) to (10);

(1)

wherein, $R^1$, $R^2$, $R^3$ and $R^4$ each independently represent an organic group, and $R^1$ and $R^2$ differ from each other, (2)

wherein, $R^1$, $R^2$, $R^3$ and $R^4$ each independently represent an organic group, and $R^1$ and $R^2$ differ from each other, (3)

wherein, n is an integer of from 1 to 18 inclusive, (4)

wherein, m and n are each independently integers of from 1 to 18 inclusive, (5)

wherein, n is an integer of from 1 to 18 inclusive, (6)

wherein, n is an integer of from 1 to 18 inclusive, and D represents deuterium, (7)

wherein, D represents deuterium, (8)

wherein, D represents deuterium, (9)

wherein, n is an integer of from 1 to 18 inclusive, and (10)

wherein, D represents deuterium.

13. The backlight system of claim 1, wherein the shell layer is comprised of at least one material selected from the group consisting of a metal, a metal oxide and a polymer.

14. The backlight system of claim 1, wherein the shell layer is comprised of at least one material having a refractive index of 1.7 or higher.

15. The backlight system of claim 1, wherein a concentration of the light-excited fluorophores is defined to increase as the distance from the edge of the at least one side of the core layer increases.

16. A display system comprising a backlight system, wherein the backlight system comprises:
- a core layer, configured to be flexible, and containing light-excited fluorophores therein;
- at least one light source arranged on an edge of one side of the core layer and configured to emit first light into the core layer through the edge thereof,
  - wherein the light-excited fluorophores are dispersed in the core layer; and
  - wherein the core layer is configured to transmit the first light therein and to emit second light caused by the light-excited fluorophores irradiated by the first light from a first surface of the core layer; and
- a shell layer arranged on the first surface of the core layer, wherein the shell layer has a lower reflectance than the core layer.

17. A method of controlling illumination of a backlight system, the method comprising:
- introducing first light by at least one light source through the edge of one side of a core layer containing light-excited fluorophores therein;
- emitting second light caused by the light-excited fluorophores, wherein the light-excited fluorophores are dispersed in the core layer; and wherein the core layer is configured to be flexible; and
- reflecting the first light by a shell layer arranged on a first surface of the core layer, wherein the shell layer has a lower reflectance than the core layer.

18. The method of claim 17, wherein the first light is ultraviolet light.

19. The method of claim 18, wherein the light-excited fluorophores are ultraviolet-excited fluorophores configured to emit visible light by irradiation of the ultraviolet light.

20. A method of manufacturing a backlight system, the method comprising:
- mixing light-excited fluorophores and transparent polymer to obtain a mixture;
- extruding the mixture to obtain a flexible core layer, wherein the light-excited fluorophores are dispersed in the core layer;
- arranging, at least one light source on an edge of one side of the core layer so as to emit first light into the core layer through the edge thereof, wherein the core layer is configured to transmit the first light therein and to emit second light caused by the light-excited fluorophores irradiated by the first light from a first surface of the core layer; and
- providing a shell layer on the first surface of the core layer, wherein the shell layer has a lower reflectance than the core layer.

21. The method of claim 20, further comprising arranging a reflective layer on at least a portion of a second surface of the core layer opposing the first surface.

22. The method of claim 20, wherein the provision of the core layer includes defining a concentration of the light-excited fluorophores to increase as the distance from the edge of the at least one side of the core layer increases.

* * * * *